United States Patent Office 3,309,345
Patented Mar. 14, 1967

3,309,345
POLYMERIC s-TRIAZINES
Ralph Lutwack, La Canada, Calif., assignor to Shell Oil Company, New York, N.Y., a corporation of Delaware
No Drawing. Original application Nov. 20, 1961, Ser. No. 153,757, now Patent No. 3,206,407, dated Sept. 14, 1965. Divided and this application Mar. 22, 1965, Ser. No. 441,907
3 Claims. (Cl. 260—79)

This patent application is a division of copending patent application Ser. No. 153,757, filed Nov. 20, 1961 and which matured as U.S. Patent 3,206,407 on Sept. 14, 1965.

The invention relates to a new and novel class of oil-soluble polymeric derivatives of s-triazines having the formula

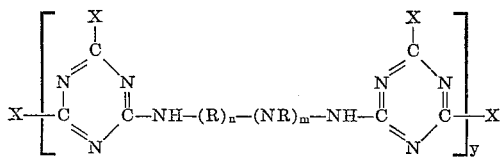

where X is a polar radical selected from the group consisting of R'O—, R'S—, R'NH—, and
R is a bivalent organic radical, preferably an alkylene radical of 2 to 20 carbon atoms such as ethylene, propylene, hexylene radicals or a phenylene radical, $n$ is an integer of at least 1, R' is a hydrocarbyl radical such as alkyl or aryl radical and $m$ may be zero or 1, $y$ is an integer of from 1 to 20, preferably 2 to 10. A preferred class of polymers of this invention is represented by the formula:

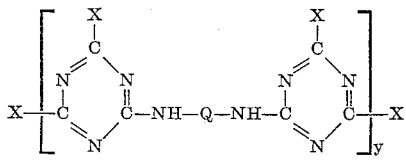

where Q is a bivalent organic radical selected from the group consisting of an arylene or an alkylene radical of from 6 to 12 carbon atoms, $y$ is an integer of from 2 to 18, preferably between 4–10, X is a residue of an alkyl mercaptan (RS—) or radical from a mono or polyamine. Polymers of the present invention can vary in molecular weight from less than 1000 to over 50,000, preferably between 1000 and 5000.

The novel alpha,omega polar modified poly(N-2-s-triazinylhydrocarbylpolyamine) polymeric compounds of this invention are prepared by reaction (A) s-triazine compounds such as cyanuric chloride with a suitable alpha,omega-polyamine in approximately equal molar proportions in a suitable solvent which may be polar or non-polar, at temperature ranges of from zero to about 50° C. and thereafter reacting at between 80–150° C. (90–110 °C.) a polymer (A) with desired polar compounds so as to attach to the terminal carbon atom of triazinyl radicals, polar groups (X) as defined above and thereby form polymer (B) of the present invention as represented by Formulas I and II. The intermediate reaction (A) may run from 1 to 48 hours and the final reaction (B) from 1 to 15 hours. The solvent in both steps may be the same or different and include non-polar solvents such as butane, n-pentane, n-hexane, n-heptane, n-octane, isooctane, benzene, decalin or polar solvents such as acetone, acetonitrile, dimethylformamide, m-cresol or the like. The preferred solvent is acetone or n-heptane and the proportion of solvent used may vary from 1 to 20 parts per part of reactants used.

The s-triazine compounds include cyanuric chloride and derivatives thereof such as aminodichloro-s-triazines, $C_{2-18}$ alkoxydichloro-s-triazines, aroxydichloro-s-triazines, e.g., phenoxydichloro-s-triazines, $C_{6-18}$ alkyldichloro-s-triazines, and the like.

The preferred polyamines are alpha,omega-ethylene, propylene, butylene, pentylene, hexylene, decamethylene diamines such as alpha,omega-propanediamine, pentanediamine, hexanediamine, heptanediamine, dodecanediamine, phenylenediamine, chlorophenylenediamine, or dipropylenetriamine, trietheylenetetraamine, tetraethylenepentaamine, and mixtures thereof The compounds whose radical is represented by the symbol (X) in the above Formulas I and II include alkyl or aryl amines such as $C_{4-18}$ alkylamine, e.g., butylamine, hexylamine, octylamine, decylamine, dodecylamine or arylamines, e.g., aniline, naphthylamine, phenylnaphthylamine; thiols such as alkyl or aryl mercaptans, e.g., butylmercaptan, octylmercaptan, dodecylmercaptan, phenylmercaptan; dithiocarbamic acids, e.g., dibutyldithiocarbamic acid, dihexyldithiocarbamic acid, etc.

The following examples illustrate the preparation of the polymeric compounds of the present invention.

Example A

To about 100 ml. of acetone containing 0.1 mol of cyanuric chloride was added dropwise at 0° C. 100 ml. of acetone containing 0.1 mol of alpha,omega-hexanediamine and the temperature was allowed to rise to 45–50° C. and the reaction mixture was stirred for 24 hours. To the reaction mixture aniline in 100 ml. of acetone was slowly added and the temperature increased to 90–100° C., for about 6 hours. The polymer formed was washed with 0.1 N HCl and water and dried at 60° C. The polymer recovered was alpha,omega-dianilinopoly-(N-2-s-triazinylhexylenediamine), which analyzed for $C_{10.8}H_{14.3}Cl_{1.0}N_{5.0}$. The polymer was oil-soluble and exhibited good antiwear and stability properties when added in concentration of about 2% in mineral oil.

Following the above procedure other polymers of the present invention were prepared as shown in Table I.

TABLE I

| Example* | Reaction Temp., ° C. and Time | S-Triazine Compound | Polyamine of Polythiol | Polar Modifier | Reaction Temp., ° C. and Time | Remarks |
|---|---|---|---|---|---|---|
| B | 0–50°, 24 hrs | Cyanuric chloride | Chloro-p-phenylene diamine. | Phenylenediamine | 75–80°, 5 hrs | Pink solid, anal. $C_{5.9}H_{4.5}Cl_{1.0}N_{2.9}$ |
| C | 20–40°, 24 hrs | N,N-butylamino-s-triazine. | 1,6-hexanediamine | Laurylamine | 80–100°, 5 hrs | White solid, MW = 3,000. |
| D | 10–45°, 24 hrs | Phenoxy-s-triazine | 1,7-heptanediamine | Dibutyldithiocarbamic acid. | 80–110°, 10 hrs | Solid, MW = 3,500. |
| E | 10–50°, 24 hrs | Cyanuric chloride | Tetraethylene pentaamine. | Stearylamine | 80–100°, 10 hrs | Solid, MW = 3,100. |
| F | 40–50° | do | Phenylenediamine | N-laurylpropylene diamine. | 70–80°, 5 hrs | MW = 2,500. |
| G | 30–50° | Lauroxy-s-triazine | 1,6-hexanediamine | $C_{3-18}$ alkylphenol | 79–90°, 5 hrs | MW = 2,000. |
| H | 10–40° | Cyanuric chloride | 1,6-hexanedithiol | Dibutyldithiocarbamic acid. | 80–100°, 10 hrs | MW = 2,500. |

*B solvent = acetone. C and O solvent = n-heptane. E and F solvent = m-cresol. G and H solvent = dimethylformamide.

The addition of from 0.1% to 5% by weight of the polymeric s-triazine containing compounds of this invention alone or in combination with from 0.01% to 2% by weight of a phenolic compound, e.g., 2,4,6-trialkyl phenols containing two tertiary alkyl groups in the 2,4- or 2,6-positions are preferred, such as 2,4-ditert-butyl-6-methyl-, 2,6-ditert-butyl-4-methylphenol or 2,6-ditert-butyl-4-methylolphenol or 4,4'-methylene bis(2,6-dibutyl-phenol), effectively stabilizes and improves various materials as oleaginous materials, polymers, fuels, waxes, resins and particularly liquid hydrocarbons such as gasoline, jet fuels, transformer oils, turbine oils, mineral lubricating oils, and industrial oils such as cutting fluids, quenching fluids, etc. The additives of this invention are particularly useful in highly refined mineral oils of the lubricating oil viscosity range (SAE 10W–SAE 90) from which natural occurring oxidation inhibitors have been removed by refining. Additionally, synthetic hydrocarbon oils and resins such as olefin polymers, e.g., ethylene/propylene, isobutylene/octadecene, isobutylene/styrene copolymers, etc., as well as synthetic oils of the ester types, e.g., di-2-ethylhexylsebacate, etc., are improved by the additive or additive combination of this invention.

The pronounced and unexpected results obtained by use of the polymeric compounds of the invention are demonstrated when to a 1010 mineral oil, 2% of additive of Example A (Composition I), or 2% of additive of Example B (Composition II), or 2% of additive of Example A and 0.3% of 2,6-ditert-butyl-4-methylphenol (Composition III) or 2% of additive of Example C and 0.2% of 2,6-ditert-butyl-4-methylolphenol (Composition IV), or 3% of additive of Example A and 0.1% of 4,4'-methylene bis(2,6-ditert-butylphenol) (Composition V), showed a wear resistance and oxidation stability of 4 to 19 times that of the 1010 neat mineral oil or the same oil containing 2% of an E.P. addition, e.g., decylmercaptothiomethylphosphonic acid (Composition X). The wear resistance was determined by the iron powder adsorption test (Transaction of the Faraday Society, vol. 45, 1949, pages 623–635) and the oxidation stability was determined by the Dornte Oxidation Test (National Petroleum News, Sept. 17, 1941, pages R294–6).

Compositions of this invention are useful for providing stability and other desired properties to petroleum products such as mineral lubricating oils which also contain small amounts (0.1% to 3%) of additive agents such as metal detergents such as metal organic sulfonates, e.g., neutral or basic Ca, Ba or Zn petroleum sulfonates; anti-wear agents such as metal thiocarbamates, e.g., Zn, Cr, or Ca dibutyl or diamyl dithiocarbamate; viscosity-index improvers, pour point depressants and non-ash forming detergents such as the oil-soluble nitrogen-free polymethacrylates available under the name "Acryloids" and, specifically, "Acryloid" 150, 618, 710, 768, described in U.S. Patent 2,710,842; extreme pressure agents such as organic sulfides, e.g., dibenzyl disulfide and mixtures thereof.

I claim as my invention:

1. As a new polymer an oil-soluble polymeric derivative of s-triazine having the formula:

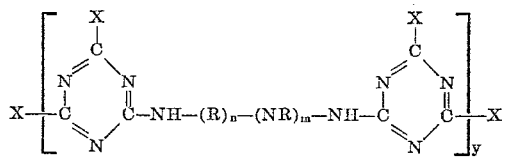

where X is

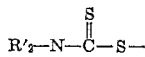

and where R' is an alkyl radical; R is a bivalent organic radical selected from the group consisting of $C_{2-20}$ alkylene and phenylene radicals, $n$ is 1, $m$ is an integer varying from zero to 1, $y$ is an integer of from 1 to 20, said polymer having a molecular weight of from about 1,000 to about 50,000.

2. As a new polymer, an oil-soluble polymeric derivative of s-triazine having the formula:

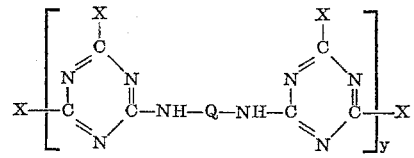

where X is

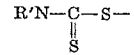

and where R' is an alkyl radical. Q is an alkylene radical of 6 to 12 carbon atoms, $y$ is an integer of from 2 to 10, having a molecular weight of from about 1,000 to about 50,000.

3. As a new polymer, an oil-soluble alpha,omega-dithiocarbamyl(N-2-s-triazinylhexylenediamine) having a molecular weight of from 1,000 to 5,000.

References Cited by the Examiner
UNITED STATES PATENTS

| | | | |
|---|---|---|---|
| 2,467,523 | 4/1949 | Dudley | 260—2.1 |
| 2,545,049 | 3/1951 | Shaefer | 260—2 |
| 2,884,383 | 4/1959 | Grundmann | 260—2 |

SAMUEL H. BLECH, *Primary Examiner.*

WILLIAM H. SHORT, *Examiner.*

J. C. MARTIN, L. P. QUAST, *Assistant Examiners.*